Jan. 21, 1964  W. W. WETTERLIN  3,118,522
GRAVE MEMORIAL STRUCTURE
Filed Jan. 29, 1962
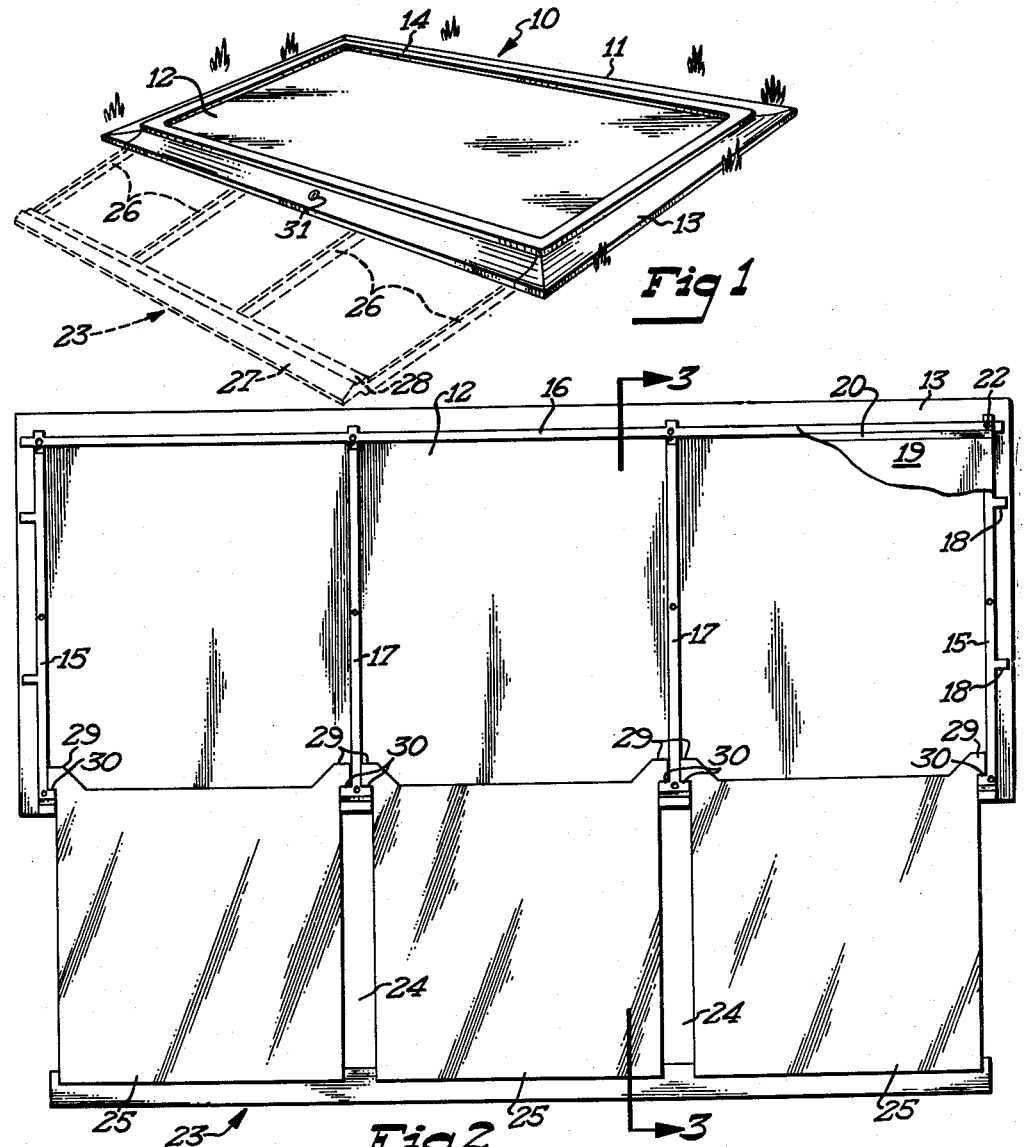
Fig 1
Fig 2
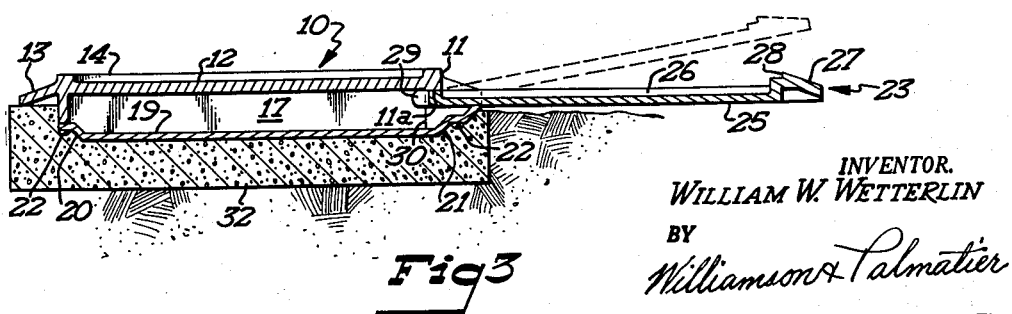
Fig 3
INVENTOR.
WILLIAM W. WETTERLIN
BY
Williamson & Palmatier
ATTORNEY

United States Patent Office 3,118,522
Patented Jan. 21, 1964

3,118,522
GRAVE MEMORIAL STRUCTURE
William W. Wetterlin, 277 N. Wilder St., St. Paul, Minn.
Filed Jan. 29, 1962, Ser. No. 169,194
5 Claims. (Cl. 189—21.2)

This invention relates to a memorial ground marker structure for use in marking graves.

An object of this invention is to provide a novel memorial ground marker structure, of simple and inexpensive construction, including a shallow rectangular housing which in use is imbedded in the ground with only a cover plate thereof being substantially disposed and a shallow tray structure slidable into and out of the housing and which may have memorial documents permanently affixed to the upper surface thereof.

Another object of this invention is to provide a novel and improved memorial ground marker structure, preferably constructed of cast bronze, and including a shallow housing which may be horizontally anchored only slightly above the surface of the ground, and a shallow compartment and tray structure slidable into and out of the housing, the upper surface of the tray structure being arranged and constructed to very nicely accommodate and to permit a plurality of memorial documents etched in metal or the like to be fixedly mounted thereon.

A further object of this invention is the provision of a novel and improved memorial ground marker structure of the class described wherein the compartmented tray structure is capable of slight vertical swinging movement to thereby permit the tray structure to be elevated for clearing obstructing undulations of the ground during extension and retraction thereof.

These and other objects and advantages of my invention will more fully appear from the following description made in connection with the accompanying drawings wherein like character references refer to the same or similar parts throughout the various views, and in which:

FIG. 1 is a perspective view of my novel memorial ground marker structure with the tray structure thereof illustrated in an extended position by dotted line configuration;

FIG. 2 is a bottom plan view on an enlarged scale of my novel memorial ground marker structure with the bottom plate thereof removed and with the tray structure thereof illustrated in an extended position; and FIG. 3 is a side elevational view taken approximately along line 3—3 of FIG. 2 and looking in the direction of the arrows and with the tray structure shown in an elevated adjusted position by dotted line configuration.

Referring now to the drawings, it will be seen that one embodiment of my novel memorial ground marker structure, designated in its entirety by the reference numeral 10, is thereshown. My novel memorial ground marker structure 10 includes a substantially rectangular shallow housing 11 which is preferably constructed of a suitable metal such as cast bronze or the like. Housing 11 is comprised of a cover plate 12. It will be seen that cover plate 12 which is shaped generally rectangularly has inclined marginal edges 13 and also has an upstanding continuous peripheral flange 14. It will be noted that this upstanding peripheral flange 14 is also of substantially rectangular configuration, as best seen in FIG. 1.

When in use, the cover plate will be exposed and the upper surface thereof may be provided with suitable inscriptions such as a name, the year and date of birth of the decedent.

Referring now to FIG. 2, it will be seen integrally formed with the cover plate 12 and depending therefrom are a pair of peripheral side flanges 15 each of which is located adjacent one of the side edges of the cover plate 12. Also integrally formed and depending from adjacent the rear edge of the cover plate 12 is a peripheral rear flange 16 and it will be noted that this rear flange 16 extends between and is interconnected with the side flanges 15. Referring again to FIG. 2, it will be seen that the cover plate 12 also has a pair of vertically disposed substantially straight guide elements affixed to the under surface thereof and which are disposed in substantially parallel relation with respect to the depending peripheral side flanges 15. It will be noted, as best seen in FIG. 3, that these depending guide elements 17 have substantially flat vertically disposed sides and the function of these guide elements will be set forth in more detail hereinbelow. Suitable reinforcing and anchoring ribs 18 extend between the depending peripheral side flanges 15 and the inclined marginal edges 13 of the cover plate associated therewith and also extend between a rear flange 16 and that portion of the inclined marginal edge of the cover plate 13 associated therewith.

The housing 11 is also provided with a substantially flat bottom plate 19 which is preferably constructed of sheet metal or the like. In this connection, it is pointed out that the bottom plate 19 is constructed separately from the remaining portion of the housing. The cover plate 12, depending peripheral flanges and the depending guide elements are integrally formed preferably from cast bronze. It will be noted that this bottom plate 19 is substantially flat but has its rear marginal edge portion upwardly bent as at 20. The forward marginal portion of the bottom plate 19 is also offset upwardly and forwardly as at 21, as best seen in FIG. 3. The bottom plate 19 is secured to the lower edges of the peripheral side flanges 15 and the rear flange 16 by means of a suitable pair of bolts 22, these bolts threadedly engaging in threaded recesses of the respective side flanges and rear flange.

Thus it will be seen that the cover plate 12, depending peripheral side flanges 15, depending rear flange 16 and the bottom plate 19 cooperate with each other to define the housing 11 and that this housing is provided with an elongate opening 11a which traverses substantially the entire front portion of the housing.

A shallow, substantially rectangular shaped tray structure 23 is extensibly and retractably slidable into and out of the housing 11 through the opening 11a. It will be noted that this tray structure 23 is provided with a pair of rearwardly opening elongate transverse slots 24 which serve to effectively divide the tray structure 23 into compartments 25.

Projecting upwardly from each of the compartments 25 is a continuous rectangular shaped peripheral flange 26. The respective upstanding flange adjacent the front marginal portions of each of the compartments 25 is continuous and rigidly connected with this upstanding flange portion is an inclined front flange 27 which projects downwardly and forwardly at an inclination corresponding to the inclination of the inclined marginal flanged edges 13 of the cover plate 12. This inclined front flange 27 cooperates with the upstanding front portion of the peripheral flange 26 for the respective compartments to define a shoulder 28 which abuts against the cover plate 12 when the tray structure 23 is completely disposed within the housing 11. When so disposed, it will be noted as best seen in FIG. 1, that the inclined front flange 27 of the tray structure is continuous with the inclined marginal flanged edges 13 of the cover plate 12.

Each of the compartments 25 has a pair of slide elements 29 which project rearwardly and laterally from adjacent the rear corner portions thereof. It will be noted, as best seen in FIG. 2, that the slide elements 29 of the respective outer compartments 25 engage the depending peripheral side flange 15 and one side of the guide element 17 while the slide elements of the inner compartment respectively engage the guide element 17. These slide elements cooperate with the guide element 17 and the peripheral side flanges to facilitate sliding movement of the tray structure 23. It will be noted that the guide element 17 project completely through the slots 24 of the tray structure 23 when the tray structure is in the retracted position within the housing 11.

Means are provided for limiting extensible sliding movement of the tray structure 23 and to thereby permit the tray structure from becoming completely separated from the housing 11. This means includes a plurality of stop or abutment elements 30 which are affixed to the front portions of the depending peripheral side flanges 15 and which are also affixed to the front portions of the guide elements 17. It will be noted, as best seen in FIG. 2, that these stop elements 30 are disposed in abutting relation with respect to the slide elements 29 and are engagable by the slide elements when the tray structure 23 is extended. It will also be seen that the marker structure may be provided with suitable lock means 31 for locking the tray structure 23 in the retracted position when in the housing 11. This lock means 31 will be of any of the conventional lock device and may be actuated by a suitable key means.

It is pointed out that the tray structure may also be formed by cast bronze in a manner of the cast bronze cover plate and associated guide elements and peripheral side flanges. It will be appreciated that bronze not only presents a very attractive appearance but is also corrosive and weather-resistant. By so forming the housing 11 with the exception of the bottom plate 19 of cast bronze, and by forming the tray structure may be constructed relatively inexpensively since no additional finishing or machining will be needed.

In use, the housing 11 will be anchored below the surface of the ground by a suitable preferably concrete footing so that the opening 11a of the housing 11 and cover plate 12 thereof are disposed slightly above the surface of the ground. The ribs 18 serve to substantially aid in the anchoring of the housing in the concrete footing 32 and it will be noted that the depending peripheral side flanges 15 and the depending peripheral rear flange 16 will be almost completely embedded in the concrete footing 32.

When so disposed, the memorial ground marker structure 10 is disposed only slightly above the surface of the ground. However, the tray structure 23 may be readily extended outwardly through the opening 11a in the housing 11 since the opening 11a will be disposed preferably slightly above the surface of the ground. Referring now to FIG. 3, it will be noted that the tray structure 23 has an overall height substantially less than the overall height of the interior of the housing 11. With this arrangement, the tray structure 23 is also capable of vertical swinging movement as indicated by dotted line configuration so that the tray structure may be elevated to clear any obstructing undulations in the ground.

The upper surface of the compartments 25 serve to support suitable memorial documents which may be permanently affixed thereto. Such documents may include the personal history, photograph, and funeral service, each compartment preferably accommodating one such memorial document. These documents may be etched in a suitable metal plate, such as aluminum or the like, and these plates may be sealingly secured in place by suitable transparent plastic such as a thermoplastic acrylic polymer resin, sold under the trademark Plexiglas. Although any suitable sealant may be employed for sealing such a transparent laminate, it is found that a polysulphide sealant may be advantageously used. It is also pointed out that the documents and photographs may also be printed upon a suitable paper or other material and this paper document may be embedded on a sheet of transparent durable plastic.

It will, therefore, be seen that such memorial documents may be permanently affixed to the tray structure 23 for substantially lasting use.

From the foregoing, it will be seen that I have provided a memorial ground marker structure of highly novel and attractive construction which includes a housing having a tray structure readily slidable into and out of the housing and which may suitably have a plurality of memorial documents affixed thereto.

It will also be seen from the preceding paragraphs that my novel memorial ground marker structure may be readily embedded in the ground in a manner so that the structure projects only slightly above the surface of the ground but which is so arranged and constructed that the memorial document bearing tray structure may be readily moved into and out of the housing even though there are slight undulations in the ground located closely adjacent and in the path of movement of the sliding tray structure.

Thus it will be seen that I have provided a highly attractive memorial ground structure which is not only of simple and inexpensive construction but which functions in a more efficient manner than any heretofore known comparable construction.

It will, of course, be understood that various changes may be made in the form, details, arrangement and proportions of the various parts without departing from the general scope of my invention.

What is claimed is:

1. A memorial ground marker for use in marking graves,
    said marker structure including a substantially flat, rectangular-shaped horizontally disposed cover plate having peripheral flanges affixed to the underside thereof and depending from adjacent opposite side edges thereof and from adjacent the rear edge thereof,
    a bottom plate fixedly connected to said flanges and cooperating with the latter and with said cover plate to define a relatively shallow housing having an elongate opening in the front portion thereof,
    said housing having portions thereof to be anchored in the ground to dispose said elongate opening and cover plate slightly above the surface of the ground,
    a shallow tray structure being extensibly and retractably slidable into and out of said housing through said opening and being vertically swingable during extension thereof,
    said tray structure having an upper surface for supporting memorial documents thereon,
    slide elements on said housing and tray structure for facilitating extensible and sliding movement of the latter and defining pivot means for permitting vertical swinging movement of the tray structure when in the extended position,
    and abutment means on said housing cooperating with said slide elements to limit sliding movement of the tray structure.

2. A memorial ground marker structure for use in marking graves,
    said marker structure including a substantially flat rectangular shaped horizontally disposed cover plate having peripheral flanges integrally formed therewith and depending from adjacent opposite sides thereof and from adjacent the rear edge thereof,
    a bottom plate fixedly connected to said flanges and cooperating with the latter and with said cover plate to define a relatively shallow housing having an elongate opening in the front portion thereof,
    said housing having portions thereof to be anchored in the ground to dispose the elongate opening and cover plate slightly above the surface of the ground,
    a compartmented shallow tray structure being extensibly and retractably slidable into and out of said housing through said opening and being vertically swingable during extension thereof, said tray structure having an upper surface upon which a plurality of memorial documents are adapted to be permanently affixed, said tray structure having a plurality of elongate transversely extending, rearwardly opening slots therein, each slot being located between adjacent of said compartments, a plurality of substantially vertically disposed, laterally spaced-apart guide elements integrally formed with the underside of said cover plate and being spaced inwardly and substantially parallel to said extending side flanges, each of said guide elements projecting downwardly through one of the slots of the tray structure, and cooperating means on said housing and tray structure for limiting extensible sliding movement of the latter.

3. The structure as defined in claim 2 wherein said means for limiting extensible sliding movement of the tray structure includes a plurality of slide elements affixed to the rear portion of said tray structure and cooperatively engaging said guide elements and said depending side flanges to facilitate sliding movement of said tray structure during extensible and retractable movement thereof.

4. A memorial ground marker structure for use in marking graves, said marker structure including a substantially flat, rectangular-shaped horizontally disposed cover plate having peripheral flanges integrally formed with the under side thereof and depending from adjacent opposite side edges thereof and from adjacent the rear edge thereof, a plurality of substantially vertically disposed, laterally spaced apart guide elements integrally formed with the underside of said cover plate and being spaced inwardly and substantially parallel to said depending side flanges, a bottom plate, fixedly connected to said flanges and cooperating with the latter and with said cover plate to define a relatively shallow housing having elongate openings traversing substantially the entire front portion thereof, said housing having portions thereof to be anchored in the ground to dispose the elongate opening and cover plate thereof disposed slightly above the surface of the ground, a compartmented shallow tray structure being extensibly and retractably slidable into and out of said housing through said opening and being vertically swingable during extension thereof, said compartmented tray structure having an upper surface upon which a plurality of memorial documents are adapted to be permanently affixed, said tray structure having a plurality of elongate transversely extending, rearwardly opening slots therein, each of the slots being located adjacent of said compartments and receiving therethrough, one of said vertically disposed guide elements, a plurality of slide elements affixed to the rear portion of said tray structure and cooperatively engaging said guide elements and said depending slide flanges to facilitate sliding movement of said tray structure during extensible and retractable movement thereof, a stop means affixed to the front portion of said housing adjacent said elongate opening and being engageable by said slide elements for limiting extensible sliding movement of said tray structure.

5. A memorial ground marker for use in marking graves, said marker including a generally rectangular marker structure formed of a rigid material and having a lower portion thereof defining anchoring means for embedding within the ground, and an upper portion projecting above the surface of the ground, said marker structure having an exteriorly opening recess therein of generally rectangular configuration, a substantially flat generally rectangular tray structure positioned within said recess and being extensibly and retractably slidable relative to said marker structure and having a thickness dimension substantially less than the corresponding dimension of said recess, a flange affixed to the leading edge of said tray structure and being of a size to close said recess when the tray structure is in the retracted position, and slide elements on said tray structure cooperatively engaging said marker structure to limit extensible movement of said tray structure and defining pivot means for permitting swinging movement of said tray structure about a substantially transverse axis.

References Cited in the file of this patent

UNITED STATES PATENTS

| | | |
|---|---|---|
| 253,668 | Blaney | Feb. 14, 1882 |
| 1,465,244 | Hager | Aug. 14, 1923 |
| 1,915,127 | Higgins | June 20, 1933 |
| 1,945,381 | Russell | Jan. 30, 1934 |
| 2,990,639 | Van Gieson | July 4, 1961 |
| 3,045,374 | Lucken | July 24, 1962 |